US008671365B2

(12) United States Patent
Berus

(10) Patent No.: US 8,671,365 B2
(45) Date of Patent: Mar. 11, 2014

(54) METHOD, APPARATUS AND COMPUTER PROGRAM PRODUCT FOR PROVIDING A CURSOR FOR INDICATING CONTEXT DATA IN A MAPPING APPLICATION

(75) Inventor: Bernard Berus, Berlin (DE)

(73) Assignee: Nokia Corporation, Espoo (FI)

( * ) Notice: Subject to any disclaimer, the term of this patent is extended or adjusted under 35 U.S.C. 154(b) by 580 days.

(21) Appl. No.: 12/323,992

(22) Filed: Nov. 26, 2008

(65) Prior Publication Data

US 2010/0131850 A1 May 27, 2010

(51) Int. Cl.
G06F 3/048 (2013.01)
(52) U.S. Cl.
USPC ............................. 715/861; 715/856; 715/862
(58) Field of Classification Search
USPC .................. 715/856, 861, 862, 207; 701/207; 345/157
See application file for complete search history.

(56) References Cited

U.S. PATENT DOCUMENTS

| | | | | |
|---|---|---|---|---|
| 5,398,188 A | * | 3/1995 | Maruyama | 701/459 |
| 5,625,771 A | * | 4/1997 | Sakaguchi et al. | 715/207 |
| 5,655,093 A | * | 8/1997 | Frid-Nielsen | 715/856 |
| 5,987,482 A | * | 11/1999 | Bates et al. | 715/206 |
| 6,088,707 A | * | 7/2000 | Bates et al. | 715/235 |
| 6,160,539 A | * | 12/2000 | Fleck | 345/173 |
| 6,202,026 B1 | * | 3/2001 | Nimura et al. | 701/455 |
| 6,236,389 B1 | | 5/2001 | Imaizumi et al. | |
| 6,351,705 B1 | * | 2/2002 | Yoshioka | 701/538 |
| 6,362,840 B1 | * | 3/2002 | Burg et al. | 715/835 |
| 6,418,373 B1 | * | 7/2002 | Omi et al. | 701/411 |
| 6,653,948 B1 | * | 11/2003 | Kunimatsu et al. | 340/995.19 |
| 7,111,254 B1 | * | 9/2006 | Rosen et al. | 715/856 |
| 7,134,095 B1 | * | 11/2006 | Smith et al. | 715/860 |
| 7,506,258 B1 | * | 3/2009 | Molander et al. | 715/734 |
| 7,509,592 B1 | * | 3/2009 | Martinez | 715/862 |
| 2003/0179133 A1 | * | 9/2003 | Pepin et al. | 342/357.08 |
| 2004/0257340 A1 | * | 12/2004 | Jawerth | 345/157 |
| 2005/0076312 A1 | * | 4/2005 | Gardner et al. | 715/853 |
| 2005/0132305 A1 | * | 6/2005 | Guichard et al. | 715/855 |

(Continued)

FOREIGN PATENT DOCUMENTS

| | | |
|---|---|---|
| EP | 0897169 A2 | 2/1999 |
| EP | 1406150 A1 | 4/2004 |

(Continued)

OTHER PUBLICATIONS

International Search Report of corresponding International Application No. PCT/FI2009/050821, dated Jan. 22, 2010. pp. 1-14.

(Continued)

*Primary Examiner* — Phenuel Salomon
(74) *Attorney, Agent, or Firm* — Ditthavong Mori & Steiner, P.C.

(57) ABSTRACT

An apparatus, method and computer program product are provided for providing a cursor for indicating context data in a mapping application. An electronic device may display a map to a user via a mapping application having a cursor. A user may provide input selecting a type of context data to be represented by the cursor. The cursor may be positioned at a location on the map, and the electronic device may obtain context data based on the user input relating to the position and area proximate the position of the cursor on the map. The electronic device may then update a representation of the cursor using visual and other indicia to reflect the context data.

16 Claims, 6 Drawing Sheets

(56) References Cited

U.S. PATENT DOCUMENTS

| | | | |
|---|---|---|---|
| 2005/0215649 A1* | 9/2005 | Bruckner et al. | 514/703 |
| 2005/0283728 A1* | 12/2005 | Pfahlmann et al. | 715/711 |
| 2008/0134047 A1* | 6/2008 | Pasupathy | 715/738 |
| 2008/0163057 A1* | 7/2008 | Lohi et al. | 715/718 |
| 2009/0326798 A1* | 12/2009 | Insolia et al. | 701/201 |
| 2010/0125409 A1* | 5/2010 | Prehofer | 701/207 |

FOREIGN PATENT DOCUMENTS

| | | | |
|---|---|---|---|
| JP | 11072346 | | 3/1999 |
| JP | 2003148976 | | 5/2003 |
| JP | 2005030800 | | 2/2005 |
| JP | 2003148976 | * | 5/2011 |
| WO | WO 2007/118559 A2 | | 10/2007 |

OTHER PUBLICATIONS

Notification of First Office Action; English summary; Office Action for related Chinese Application No. 200980147473.1, dated Mar. 29, 2013, pp. 1-9.

* cited by examiner

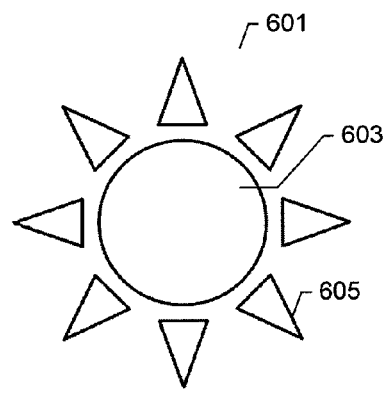
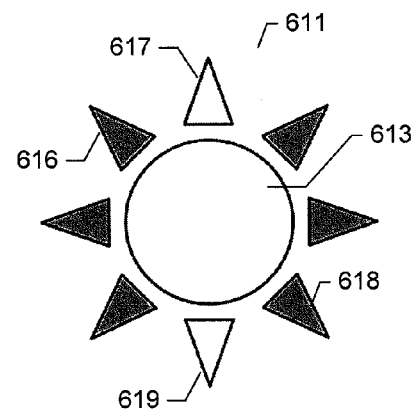
FIG. 6A          FIG. 6B
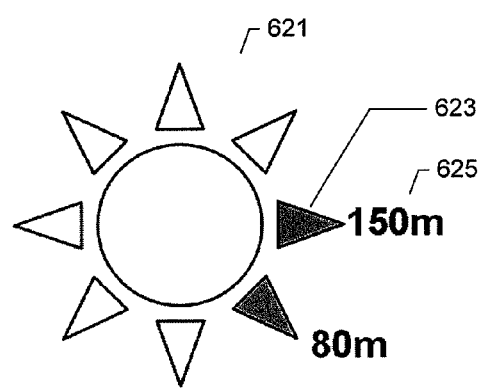
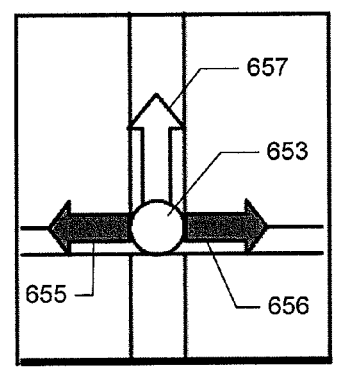
FIG. 6C          FIG. 6D

METHOD, APPARATUS AND COMPUTER PROGRAM PRODUCT FOR PROVIDING A CURSOR FOR INDICATING CONTEXT DATA IN A MAPPING APPLICATION

FIELD

Embodiments of the present invention relate generally to mobile communication technology and, more particularly, relate to methods, apparatuses, and computer program products for providing a cursor for indicating context data in a mapping application.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Despite the great utility of enabling mobile users to utilize mapping or navigation services, a common problem related to providing such services relates to identifying and indicating in a simple and convenient way various information relevant to a user based on a location on a map. Information on a map that may be relevant to a user may be indicated in one of three ways: (1) through a list of search results based on a keyword or category search; (2) through a point of interest indicator located on the map (e.g. a restaurant icon); or (3) through the look and feel of the map itself (e.g. indicating a park by coloring the map area green). Providing a list of relevant search results alongside the map may consume too much valuable screen space, due to size limitations of a screen. Additionally, it may be slower and less convenient for a user to try to correlate relevant search results with their respective locations on a map. Point of interest indicators may also create several drawbacks. For example, not every point of interest on a map may be relevant to a user, thereby adding unnecessary clutter to the map. Also, the indicators for multiple points of interest in close proximity may overlap making them difficult to locate on a map. Even changing the look and feel of the map may be limited to identifying large regions of a map rather than particular points. Another particular disadvantage of all of these indicators occurs when the map being displayed is zoomed in closely to a small area, as is typical in a GPS application. In this case, relevant information to the user may lie off of the currently displayed map making search results, point of interest indicators, and shaded regions ineffective in indicating the location and/or direction of the information.

Accordingly, it may be desirable to provide an improved mechanism by which information on a map that is relevant to a user may be clearly and quickly indicated to a user that may overcome at least some of the disadvantages described above.

BRIEF SUMMARY

In general, embodiments of the present invention provide an improvement by, among other things, providing a cursor that indicates context data in the form of location-based map information (e.g. geotagged data) relevant to the cursor's position on a map. In particular, according to embodiments of the present invention, a user may select a type of location-based map information relevant to the user's interests to be reflected by the cursor with respect to the position of the cursor on a map. For example, according to one embodiment, if a user wants to avoid certain areas on a map that might be unsafe for a pedestrian, while navigating using a mapping application (e.g. a GPS application) the cursor representing the user's current location on the map might indicate by colors, arrows, text, and other sensory indications which directions are safe to follow.

In an exemplary embodiment, a method of providing a cursor for indicating context data in a mapping application is provided. The method may include providing for display of a map, determining a position of a cursor on the map, obtaining context data relating to the position of the cursor on the map, and updating a representation of the cursor to reflect the context data. For example, the context data represented may be a variety of information, including information related to advertising, safe areas, tourist areas, traffic and road conditions, points of interest such as restaurants, nearby friends, and the like.

According to another exemplary example, a method of providing a cursor for indicating context data in a mapping application is provided. The method may include providing for display of a map, determining a position of a cursor on the map, obtaining context data relating to the position of the cursor on the map, and updating a representation of the cursor to reflect the context data. The method may further obtain context data relating to an area proximate the position of the cursor on the map. The method may further update the representation of the cursor to reflect the context data relating to the area proximate the position of the cursor on the map.

In another exemplary embodiment, a method of providing a cursor for indicating context data in a mapping application is provided. The method may include providing for display of a map, determining a position of a cursor on the map, obtaining context data relating to the position of the cursor on the map, and updating a representation of the cursor to reflect the context data. The method may further present one or more alternatives to advance the cursor based on the context data, receive user input selecting at least one of the alternatives, and update the position of the cursor on the map based, at least in part, on the selected at least one of the alternatives.

According to another exemplary embodiment, an apparatus for providing a cursor for indicating context data in a mapping application is provided. The apparatus may include a processor. The processor may be configured to provide for display of a map, determine a position of a cursor on the map, obtain context data relating to the position of the cursor on the map, and update a representation of the cursor to represent the context data.

In another exemplary embodiment, an apparatus for providing a cursor for indicating context data in a mapping application is provided. The apparatus may include means for providing for display of a map, means for determining a position of a cursor on the map, means for obtaining context data relating to the position of the cursor on the map, and means for updating a representation of the cursor to represent the context data.

In yet another exemplary embodiment, a computer program product for providing a cursor for indicating context data in a mapping application is provided. The computer program product contains at least one computer-readable storage medium having computer-executable program code portions stored therein. The computer-readable program code portions may include first, second, third, and fourth program code portions. The first program code portion may be configured to provide for display of a map. The second program code portion may be configured to determine a position of a cursor on the map. The third program code portion may be configured to obtain context data relating to the position of the cursor on the map. The fourth program code portion may be configured to update a representation of the cursor to represent the context data.

Embodiments of the invention may provide a method, apparatus and computer program product for employment in environments in which mapping, navigation, or routing services are provided. As a result, for example, users may enjoy an improved mapping or routing service on the basis of a cursor for indicating context data relating to the position of the cursor on a map.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

FIGS. 6A-D illustrate screenshots of an exemplary context-indicative cursor of exemplary embodiments of the present invention.

DETAILED DESCRIPTION

Figure 1:
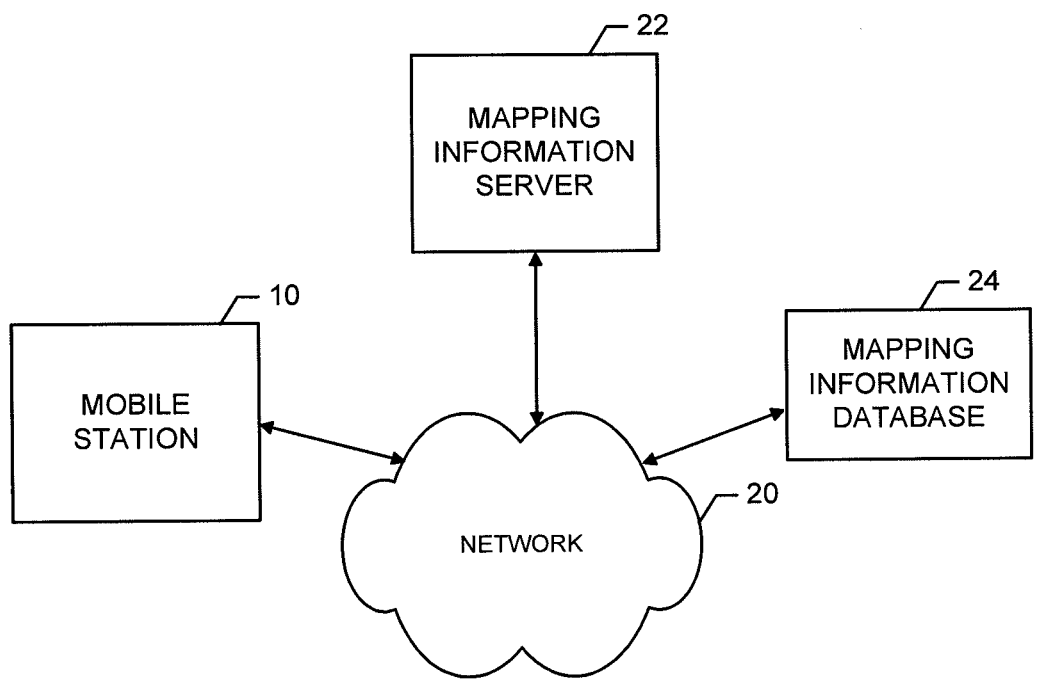
FIG. 1 illustrates a block diagram of one type of system that would benefit from embodiments of the present invention.

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout. As used herein, the term "context data" is generally defined as any information that can be used to characterize the situation of an entity. Context data parameters may include parameters related to, for example, environmental context, social context, spatio-temporal context, task context, personal context, terminal context, service context, access context, and/or the like. Of these exemplary contexts, spatio-temporal context may define the user's location (e.g., physical or geographical location) in the real world at a certain point in time. Moreover, the term "location-based map information" is used as one example of context data, which is a form of context data that provides additional information based in some fashion upon a location such as a precise location or an area within a mapped region.

Overview:

In general, embodiments of the present invention provide an apparatus, method and computer program product for updating the representation of a cursor to reflect context data relating to the position of the cursor on a map. In particular, an electronic device may receive user input selecting a type of context data in the form of location-based map information to be displayed. In one embodiment, a user may additionally specify the various indicators to use in representing the context data.

According to one embodiment, an electronic device may provide for display of a map, for example, in the context of a GPS application. The electronic device may be configured to determine the position of a cursor on the map being displayed and obtain context data, for example in the form of location-based map information, relating to the location associated with the position of the cursor and the areas proximate the position of the cursor on the map. According to one embodiment, the electronic device may provide the map and location-based map information, or in another embodiment, the electronic device may request the map and location-based map information from a Mapping Information Server and/or a Mapping Information Database.

Upon obtaining the context data, in one embodiment, the electronic device may update a representation of the cursor to reflect the context data. Updating a representation of the cursor may include updating the color and pattern schemes for the cursor, arrows and other shapes for use in conjunction with the cursor, textual cues (e.g. distances in a given direction to a point of interest), auditory cues (e.g. ring tones, alarms, or incoming calls with voice instructions), vibratory cues, flashing cues, moving elements, pop-up messages, and the like.

According to one embodiment of the present invention, the electronic device may be capable of operating a GPS application wherein the position of the cursor on the map reflects the approximate physical location of the electronic device. In another embodiment, the electronic device may be capable of operating a map browsing application wherein the user interacts with the map by repositioning the cursor on the map. In a further embodiment, the electronic device may be capable of operating a route planning application wherein at a given decision point in the route, the electronic device may present one or more alternatives based on context data for advancing the cursor, receive user input selecting an alternative, and update the position of the cursor based on the selected alternative.

Overall System and Electronic Device:

Referring now to FIG. 1, an embodiment of a system in accordance with an example embodiment of the present invention is illustrated. The system of FIG. 1 may include a mobile station 10, a Mapping Information Server 22, and a Mapping Information Database 24. The mobile station 10, Mapping Information Server 22, and Mapping Information Database 24 may be interconnected via the illustrated network 20. Furthermore, each of the mobile station 10, the Mapping Information Server 22, and the Mapping Information Database 24 may be any device or means embodied in hardware, software or a combination of hardware and software configured for the performance of the corresponding functions of the mobile station 10, the Mapping Information Server 22, and the Mapping Information Database 24, respectively, as described below.

In an example embodiment, the mobile station 10, which will be described below in greater detail, may receive and interact with requests from users. Various types of content, such as, but not limited to, music, audio, videos, pictures, maps, games, data files, books, text, journals, documents, messages, profile information, privacy options, television/radio programs or channels, internet sites or links, and/or the like, may be synchronized with and/or otherwise transferred to and from, mobile station 10. The mobile station 10 may also enable users to acquire content via the mobile station 10. In some cases the mobile station 10 may enable users to utilize the Mapping Information Server 22 and/or the Mapping Information Database 24 for storage and retrieval of content by the mobile station 10.

In another embodiment, as will be appreciated, by directly or indirectly connecting the mobile stations and the processing elements (e.g. Mapping Information Server 22 and/or Mapping Information Database 24) and/or any of a number of other devices to the Network, the mobile station and processing elements can communicate with one another to thereby carry out various functions of the respective entities, such as to transmit and/or receive data, content or the like. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of the present invention.

In one embodiment, the Mapping Information Server 22 and/or Mapping Information Database 24, each of which will be described below in greater detail, may communicate with the mobile station 10 to handle requests for map information and/or context data. The Mapping Information Server 22 can be any of a variety of server devices including a single server device for serving map information and/or context data or a plurality of server devices working together in some distributed fashion. According to one embodiment, the Mapping Information Server may access a Mapping Information Database 24 for retrieving the map information and/or context data. The Mapping information Database 24, similarly, can be any of a variety of memory devices including a single memory device for storing map information and/or context data or a plurality of memory devices working together in some distributed fashion.

Figure 2:
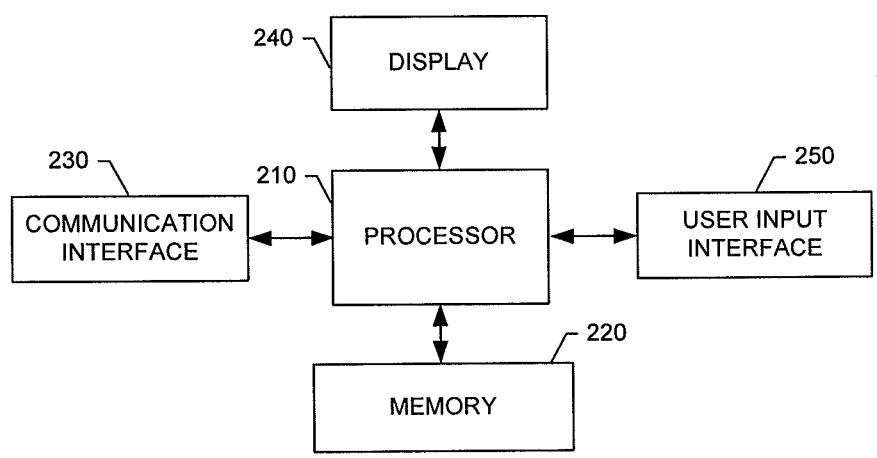
FIG. 2 illustrates a schematic block diagram of an entity capable of operating as a Mapping Information server in accordance with embodiments of the present invention.

Referring now to FIG. 2, a block diagram of an entity capable of operating as a Mapping Information Server 22 is shown in accordance with one embodiment of the present invention. The entity capable of operating as a Mapping Information Server 22 includes various means for performing one or more functions in accordance with embodiments of the present invention, including those more particularly shown and described herein. It should be understood, however, that one or more of the entities may include alternative means for performing one or more like functions, without departing from the spirit and scope of the present invention. As shown, the entity capable of operating as a Mapping Information Server 22 may generally include means, such as a processor 210 for performing or controlling the various functions of the entity.

The processor 210 may be embodied in a number of different ways. For example, the processor 210 may be embodied as various processing means such as a processing element, a coprocessor, a controller or various other processing devices including integrated circuits such as, for example, an ASIC (application specific integrated circuit), an FPGA (field programmable gate array), a hardware accelerator, and/or the like. In an example embodiment, the processor 210 may be configured to execute instructions stored in the memory 220 or otherwise accessible to the processor 210.

In particular, the processor 210 may be configured to perform the processes discussed in more detail below with regard to FIG. 4. For example, according to one embodiment the processor 210 may be configured to receive a request for a map of a particular area, retrieve the map, and transmit a representation of it (e.g. to a mobile station 10). The processor 210 may be further configured to receive a request for a type of user-selected location-based map information and a position on a map (e.g. from a mobile station 10), wherein location-based map information relevant to the position on the map is determined and transmitted (e.g. to a mobile station 10). According to another embodiment, the processor 210 may be configured to retrieve the map by requesting the map from a separate database (e.g. the Mapping Information Database 24) and receiving a response from the database. According to another embodiment, the processor 210 may be configured to determine the location-based map information by requesting the information from a separate database (e.g. the Mapping Information Database 24) and receiving a response from the database.

In one embodiment, the processor is in communication with or includes memory 220, such as volatile and/or non-volatile memory that stores content, data or the like. For example, the memory 220 may store content transmitted from, and/or received by, the entity. Also for example, the memory 220 may store software applications, instructions or the like for the processor to perform steps associated with operation of the entity in accordance with embodiments of the present invention. In particular, the memory 220 may store software applications, instructions or the like for the processor to perform the operations described above and below with regard to FIG. 4 for providing a cursor for indicating context data in a mapping application.

For example, according to one embodiment, the memory 220 may store one or more modules for instructing the processor 210 to perform the operations including, for example, a retrieving module and a determining module. In one embodiment, the retrieving module may be configured to receive a request for a map of a particular area, retrieve the map, and transmit a representation of it. In one embodiment, the determining module may be configured to receive a request for a type of user-selected location-based map information and a position on a map (e.g. from a mobile station 10), wherein location-based map information relevant to the position on the map is determined and transmitted.

In addition to the memory 220, the processor 210 can also be connected to at least one interface or other means for displaying, transmitting and/or receiving data, content or the like. In this regard, the interface(s) can include at least one communication interface 230 or other means for transmitting and/or receiving data, content or the like, as well as at least one user interface that can include a display 240 and/or a user input interface 250. The user input interface, in turn, can comprise any of a number of devices allowing the entity to receive data from a user, such as a keypad, a touch display, a joystick or other input device.

While the foregoing refers to a Mapping Information "server," the functionality described above as being performed by the Mapping Information Server 22 may be implemented on any type of computing device and could operate in computer architectures other than client/server systems. The Mapping Information Server 22 may also be implemented as one or more connected servers (e.g. one server for providing maps and another server for providing location-based map information). Additionally, while the foregoing refers to a Mapping Information "database," the Mapping Information Database 24 may be implemented as one or more connected databases (e.g. one database for providing maps and another database for providing location-based map information). In addition, while reference is made to software "modules," the software need not be modularized and, instead, may be intermingled or written in other non-modular formats without departing from the spirit and scope of embodiments of the present invention.

It should further be understood that embodiments of the present invention contemplate a mobile station 10 as described below with respect to FIG. 3 that may be additionally capable of performing some or all of the operations of a Mapping Information Server 22 and/or Mapping Information Database. For example, a mobile station 10 may be capable of locally storing maps and location-based map information thereby obviating the need to request a map or location-based map information from a separate entity.

In one embodiment the mobile station 10, Mapping Information Server 22, and/or Mapping Information Database 24 may have an interface for receiving the location-based map information. In a further embodiment, the interface may link the mobile station 10, Mapping Information Server 22, and/or Mapping Information Database 24 with various sources (e.g. police departments) that provide relevant information and statistics about the areas displayed on the map (e.g. number of traffic accidents, location of traffic accidents, etc.). The mobile station 10, Mapping Information Server 22, and/or Mapping Information Database 24 may then process and adapt the information received from those sources that are relevant to the requested context data and location on a map. As described below, a map may be displayed based on this information and, in one embodiment, the map may have different areas colored or highlighted to indicate the various densities of relevant location-based map information related to those areas on the map (e.g. the density of traffic accidents in a certain area of the map).

Figure 3:
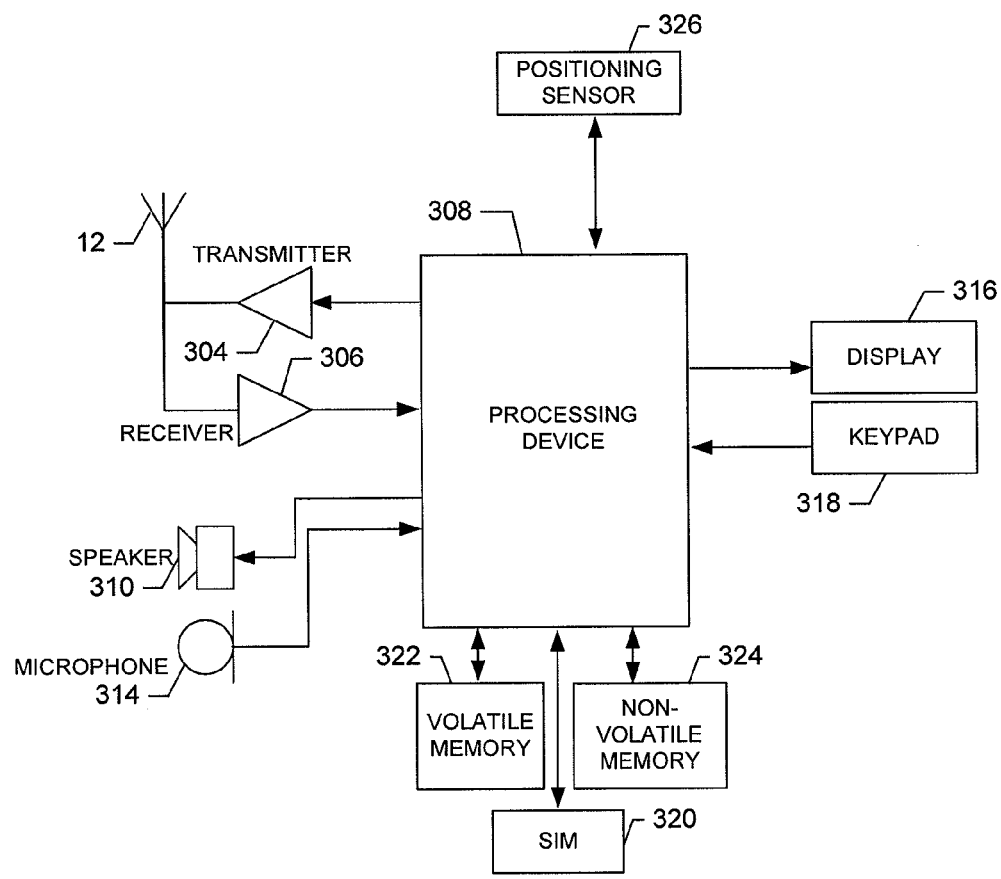
FIG. 3 illustrates a schematic block diagram of a mobile station capable of operating in accordance with an embodiment of the present invention.

Reference is now made to FIG. 3, which illustrates one type of electronic device that would benefit from embodiments of the present invention. As shown, the electronic device may be a mobile station 10, and, in particular, a cellular telephone. It should be understood, however, that the mobile station illustrated and hereinafter described is merely illustrative of one type of electronic device that would benefit from the present invention and, therefore, should not be taken to limit the scope of the present invention. While several embodiments of the mobile station 10 are illustrated and will be hereinafter described for purposes of example, other types of mobile stations, such as personal digital assistants (PDAs), pagers, laptop computers, desktop computers, gaming devices, cameras, GPS devices, as well as other types of electronic systems including both mobile, wireless devices and fixed, wireline devices, can readily employ embodiments of the present invention.

The mobile station includes various means for performing one or more functions in accordance with embodiments of the present invention, including those more particularly shown and described herein. It should be understood, however, that the mobile station may include alternative means for performing one or more like functions, without departing from the spirit and scope of the present invention. More particularly, for example, as shown in FIG. 3, in addition to an antenna 302, the mobile station 10 includes a transmitter 304, a receiver 306, and an apparatus that includes means, such as a processor 308 that provides signals to and receives signals from the transmitter 304 and receiver 306, respectively, and that performs the various other functions described below including, for example, the functions relating to updating the representation of a cursor to reflect context data relating to the position of the cursor on a map.

As discussed in more detail below with regard to FIG. 4, in one embodiment, the processor 308 may be configured to provide for display of a map, determine a position of a cursor on the map, obtain context data relating to the position of the cursor on the map, and update a representation of the cursor to represent the context data.

In various embodiments, the signals provided to and received from the transmitter 304 and receiver 306, respectively, may include signaling information in accordance with the air interface standard of the applicable cellular system and also user speech and/or user generated data. In this regard, the mobile station can be capable of operating with one or more air interface standards, communication protocols, modulation types, and access types. More particularly, the mobile station can be capable of operating in accordance with any of a number of second-generation (2G), 2.5G and/or third-generation (3G) communication protocols or the like. Further, for example, the mobile station can be capable of operating in accordance with any of a number of different wireless networking techniques, including Bluetooth, Institute of Electrical and Electronics Engineers, Inc. (IEEE) 802.11 wireless local area network (WLAN) (or Wi-Fi®), IEEE 802.16 worldwide interoperability for microwave access (WiMAX), ultra wideband (UWB), and the like.

It is understood that the processor 308 may include the circuitry required for implementing the video, audio, and logic functions of the mobile station and may be capable of executing application programs for implementing the functionality discussed herein. For example, the processor 308 may be embodied in a number of different ways. For example, the processor 308 may be embodied as various processing means such as a processing element, a coprocessor, a controller or various other processing devices including integrated circuits such as, for example, an application specific integrated circuit (ASIC), a field programmable gate array (FPGA), a hardware accelerator, and/or the like. In an example embodiment, the processor 308 may be configured to execute instructions stored in the non-volatile memory 324 or otherwise accessible to the processor 308. The processor 308 may also include the functionality to convolutionally encode and interleave message and data prior to modulation and transmission. Further, the processor 308 may include the functionality to operate one or more software applications, which may be stored in memory. For example, the processor 308 may be capable of operating a connectivity program, such as a conventional Web browser. The connectivity program may then allow the mobile station to transmit and receive Web content, such as according to Hypertext Transfer Protocol (HTTP) and/or the Wireless Application Protocol (WAP), for example.

The mobile station may also comprise means such as a user interface including, for example, a conventional earphone or speaker 310, a ringer 312, a microphone 314, a display 316, all of which are coupled to the processor 308. The user input interface, which allows the mobile station to receive data, can comprise any of a number of devices allowing the mobile station to receive data, such as a keypad 318, a touch display (not shown), a microphone 314, or other input device. In embodiments including a keypad, the keypad can include the conventional numeric (0-9) and related keys (#, *), and other keys used for operating the mobile station and may include a full set of alphanumeric keys or set of keys that may be activated to provide a full set of alphanumeric keys. Although not shown, the mobile station may include a battery, such as a vibrating battery pack, for powering the various circuits that are required to operate the mobile station, as well as optionally providing mechanical vibration as a detectable output.

The mobile station 10 may include a positioning sensor 326. The positioning sensor 326 may include, for example, a global positioning system (GPS) sensor, an assisted global positioning system (Assisted-GPS) sensor, etc. In one embodiment, however, the positioning sensor includes a pedometer or inertial sensor. Further, the positioning sensor may determine the location of the mobile station 10 based upon signal triangulation or other mechanisms. The positioning sensor is capable of determining a location of the mobile station 10, such as latitude and longitude coordinates of the mobile station 10 or a position relative to a reference point such as a destination or a start point. Information from the positioning sensor may be communicated to a memory of the mobile station 10 or to another memory device to be stored as a position history or location information. Furthermore, the memory of the mobile station may store instructions for determining cell id information. In this regard, the memory may store an application program for execution by the processing device 308, which determines an identity of the current cell, i.e., cell id identity or cell id information, with which the mobile station is in communication. In conjunction with the positioning sensor, the cell id information may be used to more accurately determine a location of the mobile station.

The mobile station can also include means, such as memory including, for example, a subscriber identity module (SIM) 320, a removable user identity module (R-UIM) (not shown), or the like, which may store information elements related to a mobile subscriber. In addition to the SIM, the mobile station can include other memory. In this regard, the mobile station can include volatile memory 322, as well as other non-volatile memory 324, which can be embedded and/or may be removable. For example, the other non-volatile memory may be embedded or removable multimedia memory cards (MMCs), secure digital (SD) memory cards, Memory Sticks, EEPROM, flash memory, hard disk, or the like. The memory can store any of a number of pieces or amount of information and data used by the mobile station to implement the functions of the mobile station. For example, the memory can store an identifier, such as an international mobile equipment identification (IMEI) code, international mobile subscriber identification (IMSI) code, mobile station integrated services digital network (MSISDN) code, or the like, capable of uniquely identifying the mobile station. The memory can also store content. The memory may, for example, store computer program code for an application and other computer programs. In particular, according to one embodiment, the memory may store the display module, the determining module, the obtaining module, and the updating module described below with regard to FIG. 4. For example, in one embodiment of the present invention, the display module may be configured to provide for display of a map. The determining module may be configured to determine a position of a cursor on the map. The obtaining module may be configured to obtain context data relating to the position of the cursor on the map. The updating module may be configured to update a representation of the cursor to represent the context data.

The method, apparatus, and computer program product of embodiments of the present invention are primarily described in conjunction with mobile communications applications. It should be understood, however, that the method, apparatus, and computer program product of embodiments of the present invention can be utilized in conjunction with a variety of other applications, both in the mobile communications industries and outside of the mobile communications industries. For example, the method, apparatus, and computer program product of embodiments of the present invention can be utilized in conjunction with wireline and/or wireless network (e.g., Internet) applications.

Figure 4:
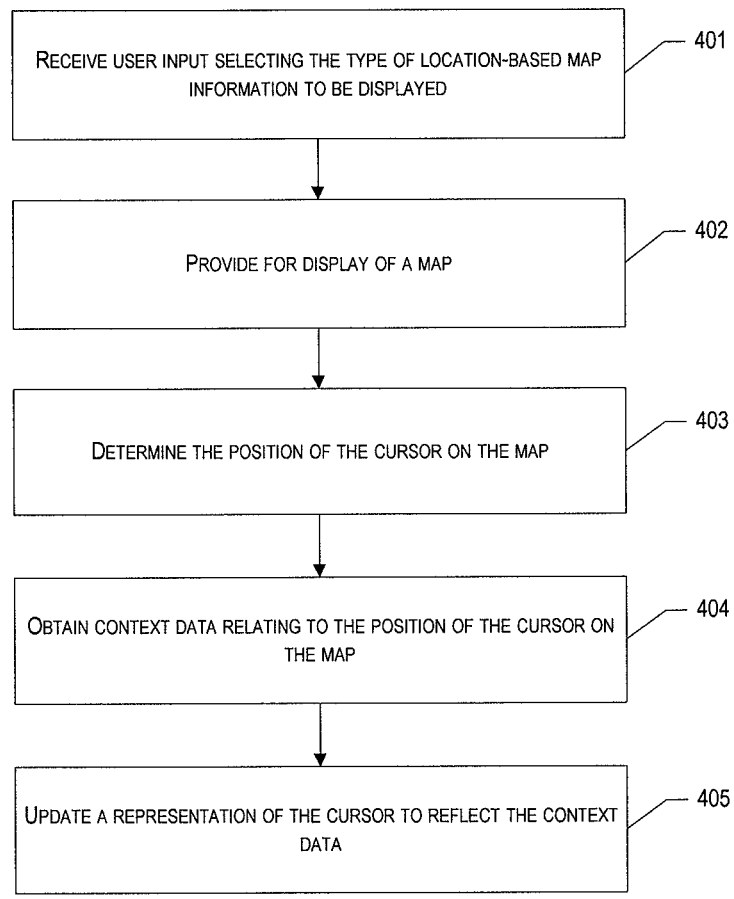
FIG. 4 illustrates a flow chart illustrating the process for providing a cursor for indicating context data in a mapping application in accordance with embodiments of the present invention.
Figure 5:
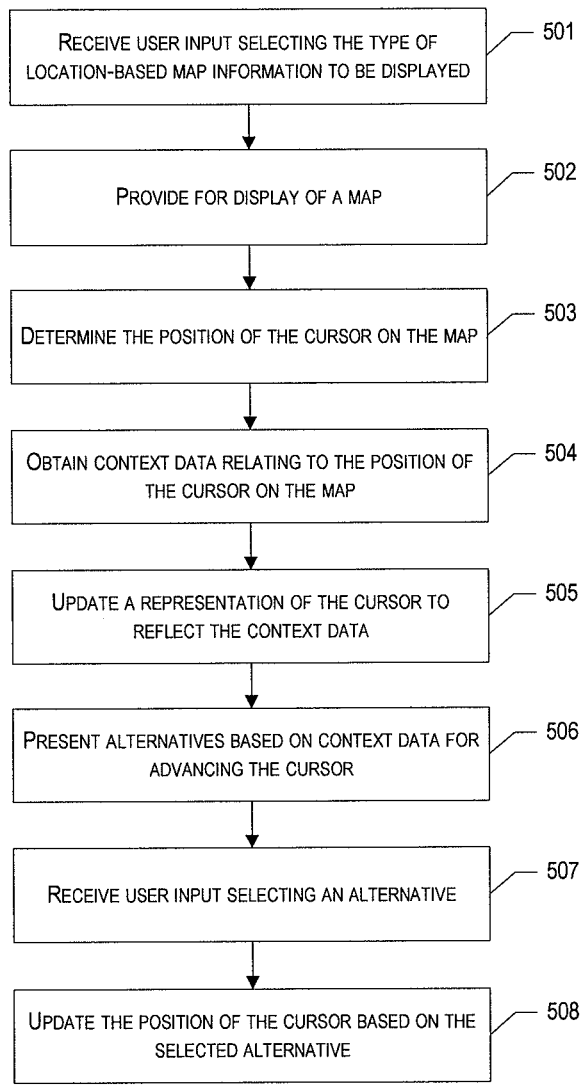
FIG. 5 illustrates a flow chart illustrating the process for providing a cursor for indicating context data in a mapping application in accordance with embodiments of the present invention.

Method of Providing a Cursor for Indicating Context Data in a Mapping Application FIGS. 4 and 5 illustrate block diagrams of a system for providing a cursor for indicating context data in a mapping application according to an exemplary embodiment of the present invention. The cursor or indicator may be provided in various forms, including but not limited to: an indication of the user's location on a map (i.e. centered on a map or at the present location of the user on a map of a defined area), a navigation arrow (e.g. when in navigation mode), a navigation point (e.g. when in pedestrian navigation mode), a route pointer (e.g. when in routing mode), a center point on a map (e.g. when in address search mode), or a selector on a map (e.g. when in browsing mode). The systems of FIGS. 4 and 5 will be described, for purposes of example, in connection with the mobile station 10 of FIG. 1. However, it should be noted that the systems of FIGS. 4 and 5, may also be employed in connection with a variety of other devices, both mobile and fixed, and therefore, embodiments of the present invention should not be limited to application on devices such as the mobile station 10 of FIG. 1. It should also be noted, that while FIGS. 4 and 5 illustrate examples of a configuration of a system for providing a cursor for indicating context data in a mapping application, numerous other configurations may also be used to implement embodiments of the present invention.

Referring now to FIGS. 4 and 5, the operations are illustrated that may be taken in order to provide a context-indicative cursor that represents location-based map information relevant to the position of the cursor on a map. As shown, the process may begin at Block 401 where the mobile station 10 and, in particular, means such as a processing device 308 operating on the mobile station 10 may receive a user input for selecting or defining a type of location-based map information to be displayed. The user input received may, for example, identify context parameters that help to identify a context. In one embodiment, the user may select a predefined location-based map information data set option from a menu (e.g. an option for road safety data). In another embodiment, a user may specify a category of location-based map information to be displayed, such as "entertainment." Alternatively, a user may specify a search term or keyword related to the location-based map information desired. For example, a user may specify the search term "restaurant" to indicate that the user would like to receive indications on the cursor related the proximity of restaurants to the location of the position of the cursor on a map. In another embodiment, the user may specify multiple categories, multiple search terms or keywords, or a combination thereof. In fact, any number of techniques for receiving user input may be used to specify a type of location-based map information in accordance with embodiments of the present invention.

In addition to receiving user input selecting or defining the type of location-based map information to be displayed, according to further embodiments of the present invention, the user may select the types of indications desired for reflecting the location-based map information (e.g. visual, aural, and other sensory indicators). For example, according to one embodiment, a user may select a color scheme for the cursor to represent various types of information on the map. In another embodiment, the selected color scheme may correspond to known color schemes such as those used in traffic lights, thermometers, and the like. For example, in the case of a traffic light color scheme, the color green may be used to designate safe routes, yellow for moderately safe routes, and red for unsafe routes. Similarly, a user may select a color scheme for the cursor to represent the distance of the desired location-based map information from the location associated with the position of the cursor, such as the color green for a restaurant within 500 meters, yellow for a restaurant between 500 and 1000 meters away, and red for a restaurant greater than a kilometer from the location associated with the position of the cursor on the map. Moreover, a variety of colors may be used across the spectrum of colors that are indicative of corresponding relative degrees of safety or distance, respectively. According to further embodiments, a user may select various other types of indicators such as color and pattern schemes for the cursor, arrows and other shapes for use in conjunction with the cursor, textual cues (e.g. distances in a given direction to a point of interest), auditory cues (e.g. ring tones, alarms, or incoming calls with voice instructions), vibratory cues, flashing cues, moving elements, or pop-up messages. In fact, many types of indications may be used to reflect desired location-based map information without departing from the spirit and the scope of embodiments of the present invention.

At Block 402, the mobile station 10, and, in particular, means, such as a processing device 308, and, in one embodiment, the display module, may provide for the display of a map. In one embodiment, the mobile station 10, may request map information from a server, such as the Mapping Information Server 22. According to one embodiment, the mobile station 10 may specify to the Mapping Information Server 22 a particular area or region of a map to be displayed. For example, the request may include sets of coordinates identifying the boundaries of the map to be displayed. In an exemplary embodiment of the invention, the mobile terminal 10 has a positioning sensor 326, which may be any device or means embodied in either hardware, software, or a combination of hardware and software that is configured to determine the approximate location of the mobile station 10 through any of several location detection techniques, including but not limited to, GPS, assisted GPS (AGPS), near field radio technologies, or operator network as well as other techniques mentioned herein in connection with the above description of the positioning sensor 326. Therefore, according to one embodiment, the request may include the approximate location of the mobile station 10 as determined by the positioning sensor 326. In fact, any number of techniques for identifying a particular region or area may be used to request a map of that area or region in accordance with embodiments of the present invention. In one embodiment, the Mapping Information Server 22, and, in particular, means, such as a processor 210 may be configured to provide the requested map information. In another embodiment, the Mapping Information Server 22 may obtain the map information from a database, such as the Mapping Information Database 24. Alternatively, according to one embodiment, the mobile station 10, may be capable of performing some or all of the functions of the Mapping Information Server 22 and/or the Mapping Information Database 24.

Once the requested map is obtained by the mobile station 10, the mobile station 10 may provide for display of the map to the user, according to one embodiment, in a mapping application. For example, the map requested may represent the current position of the mobile station 10 and be displayed to the user via a GPS mapping application. Alternatively, in one embodiment, the map requested may represent a particular area or region of interest to the user unrelated to the current position of the mobile station 10. Most mapping applications may employ a cursor to either identify the current location of a user on a map (e.g. in a GPS mapping application) or to allow the user to interact with a map (e.g. in a map browsing application). According to one embodiment, the mapping application may provide for the display of two cursors. For example, one cursor may identify the current location of a user on a map and the other cursor may allow the user to interact with the map, simultaneously. In Block 403, the mobile station 10 and, in particular, means, such as a processing device 308, and, in one embodiment, the determining module, may determine the position of the cursor on the map. Determining the position of the cursor on the map, according to one embodiment, may entail determining the coordinates of the position on the map where the cursor currently resides. In another embodiment, the cursor may be provided with position data to position the cursor at a location on the map. For example, in a GPS mapping application, the cursor may represent the approximate physical location of the mobile station 10, and therefore the location of the cursor may be determined to be the same as the approximate location of the mobile station 10 as may be determined, in one embodiment, by the positioning sensor 326.

At Block 404, the mobile station 10, and, in particular, means, such as a processing device 308, and, in one embodiment, the obtaining module, may obtain context data or context parameters relating to the position of the cursor on the map or the position data provided to the cursor. According to a further embodiment of the present invention, the mobile station 10 may obtain context data relating to an area proximate the position of the cursor on the map. In order to obtain the context data in the form of location-based map information to be displayed, according to one embodiment, the mobile station 10, may request location-based map information from a server, such as the Mapping Information Server 22. For example, according to one embodiment, the mobile station 10 may supply the Mapping Information Server 22 with the user input for selecting or defining a type of location-based map information to be displayed. Additionally, the mobile station 10 may supply the Mapping Information Server 22 with a location corresponding to the position of the cursor on the map. In one embodiment, the Mapping Information Server 22, and, in particular, means, such as a processor 210 may be configured to determine location-based map information of the requested type related to the location corresponding to the position or an area proximate the position of the cursor on the map. In another embodiment, the Mapping Information Server 22 may obtain the location-based map information from a database, such as the Mapping Information Database 24. Alternatively, according to one embodiment, the mobile station 10, may be capable of performing some or all of the functions related to obtaining the location-based map information of the Mapping Information Server 22 and/or the Mapping Information Database 24. For example, in one embodiment, the mobile station 10 may store context data in the form of location-based map information accessible locally (e.g. in non-volatile memory 324), thereby obviating the need to communicate with the Mapping Information Server 22 and/or Mapping Information Database 24 to obtain the context data.

According to an exemplary embodiment, a representation of the cursor may be updated by the mobile station 10, and in particular means such as a processing device 308, and, in one embodiment, the updating module, to reflect the context data in the form of location-based mapping information, as in Block 405. According to one embodiment, the cursor may be associated with the context data thereby creating a link or interface between the two, such that the cursor communicates the context data to the user. In a further embodiment, a representation of the cursor may be updated in one or more ways to interpret the one or more context parameters. Similarly, in another embodiment, a representation of the cursor may be updated based on the received one or more context parameters. As described above, in one embodiment, the location-based mapping information may be related to the position of the cursor on the map or, in another embodiment, may be related to an area proximate the position of the cursor on the map. In one embodiment, updating a representation of the cursor may comprise determining one or more visible indicia representing the context data in the form of location-based mapping information and updating the representation of the cursor to include the one or more visible indicia. According to further embodiments, updating the representation of the cursor may include updating the color and pattern schemes for the cursor, arrows and other shapes used in conjunction with the cursor, textual cues (e.g. distances in a given direction to a point of interest), and flashing cues. In another embodiment, moving the cursor on the map may result in displaying a trail of the cursor on the map wherein the visible indicia of the trail reflect the location-based mapping information relevant to the position or the area proximate the position of the trail. In some embodiments of the invention, the visible indicia may be accompanied by alerts, such as auditory cues (e.g. ring tones, alarms, or incoming calls with voice instructions), vibratory cues, or pop-up messages. The mobile station 10, according to one embodiment, may be further configured to provide for generation of the auditory or vibratory cues. According to one embodiment, for example, an alert or cue may occur when the cursor, or user, approaches an intersection on the map where traffic accidents frequently occur. Additionally, the mobile station 10 according to another embodiment may be further configured to display an additional textual indicator, for instance, representing the search term for the location-based mapping information currently displayed (e.g. "Restaurant") or indicating a status reflecting the current position of the cursor on the map (e.g. "Safe Area"). In fact, any type of visible indication or other accompanying indication may be used to reflect desired location-based map information without departing from the spirit and the scope of embodiments of the present invention.

According to an exemplary embodiment of the present invention, the visible indicia may comprise a color selected from a plurality of colors, each color being associated with a different context data. For example, in one embodiment of the present invention, the mobile station 10, and in particular means such as a processing device 308, may be configured to operate a GPS application having a context-indicative cursor. A user may select to display location-based mapping information related to route safety while en route (e.g. walking, driving, biking, boating, etc). In one embodiment, the color of the cursor may be updated to reflect the safety information of the current position of the mobile station 10 (e.g. the cursor may be green when the current location is considered safe or red when the current location is considered unsafe).

According to another embodiment, the visible indicia of the cursor may include one or more arrows indicative of the context data relating to the area proximate the position of the cursor on the map. The colors of the one or more arrows, in another embodiment, may also be updated to reflect the location-based mapping information of the area proximate the position of the mobile station 10. For example, in one embodiment, as shown in FIG. 6A, the cursor may be represented in the shape of a compass 601 with a central area 603 representative of the location-based mapping information relevant to the present location of the mobile station 10, and the arrows 605 surrounding the central area representative of the location-based mapping information relevant to the area proximate the present location of the mobile station 10. For example, as shown in FIG. 6B, the central area 613 of the compass 611 and the arrows on the top 617 and bottom 619 may be one color, represented here by no shading, to represent the location-based map information of the current position of the cursor on the map as well as in front of and behind that position (e.g. designating a safe route), while the arrows to the left 616 and right 618 may be another color, represented here by shading, to represent the location-based map information of the location to the left and right of the position of the cursor on the map (e.g. designating an unsafe route). It should also be noted, that while FIG. 6B illustrates an example of a representation of a cursor for indicating context data in a mapping application, numerous other representations may be used to implement embodiments of the present invention. Embodiments of the present invention should not be seen as limited to representing only two instances of location-based map information relevant to a user selected input, but as many as three or more instances may be represented by the same context-indicative cursor. Furthermore, embodiments of the present invention are not limited to representing the one or more instances of location-based map information relevant to the user selected input with this representation of a cursor and/or color scheme, but, in fact, may use many different cursor representations, color schemes, or other methods as described above and below for representing the location-based map information.

In another embodiment, the visible indicia may include a textual or other similar type indication of the distance from the position of the cursor on the map or, for example, the present location of the mobile station 10 to a predefined location on the map, such as a relevant instance of location-based mapping information (e.g. a point of interest). For example, according to one embodiment, the textual distance 625 from the mobile station 10 to a relevant point of interest may be displayed proximate one or more arrows 623 associated with the cursor and pointing in the direction of the point of interest, as in FIG. 6C. A further embodiment of the present invention may update the representation of the cursor such that the length of the one or more arrows reflect the distance to the point of interest (e.g. a shorter arrow indicates a shorter distance to the point of interest). In fact, many types and forms of visible indicia or other accompanying indicia may be used to reflect desired location-based map information without departing from the spirit and the scope of embodiments of the present invention.

According to another embodiment of the present invention, the mobile station 10, and, in particular, means such as a processing device 308, may be configured to operate a map browsing application having a context-indicative cursor. A user may interact with a map (e.g. a fixed map representation of a given area or location) by repositioning the cursor at various locations on the map. As the cursor is repositioned on the map (e.g. by input via a touch screen, keypad, trackball, mouse, etc.), according to one exemplary embodiment of the present invention, the representation of the cursor may be updated continuously to reflect the context data in the form of location-based mapping information associated with the current position of the cursor on the map. For example, a user may select to display location-based mapping information related to safety. In one embodiment, the color of the cursor may be updated to reflect the safety information of the current position of the cursor on the map (e.g. the cursor may be green when the current position of the cursor on the map is considered safe or red when the current position of the cursor on the map is considered unsafe).

According to a further embodiment of the present invention, the relevant location-based map information may lie at a location outside of the visible portion of the map. For example, the cursor may indicate in some way that a point of interest is located to the right of the cursor, but no point of interest may be currently visible in that direction on the map as the location of the context data indicated by the cursor is beyond the far right edge of the visible portion of the map. In one embodiment, a user may then indicate a desire to view the location-based information that is not currently visible on the map, for example by moving the cursor in the direction of the edge of the map beyond which the context data lies. In one embodiment, such an indication may cause the map to temporarily display the area beyond the visible portion of the map in the indicated direction, so as to temporarily display the context data that was previously located beyond the visible portion of the map, before returning back to the original map area and cursor location. In another embodiment, the visible portion of the map may temporarily zoom out so as to display the context data that was previously located beyond the visible portion of the map before zooming back in to the original map magnification and location. According to another embodiment, a window displaying a portion of the map beyond the edge of the original map, in the direction indicated by the user, may be temporarily opened to allow the user to view the context data lying beyond the visible portion of the original map. In various embodiments, a combination of the methods for displaying a portion of the map beyond the edge of the original map may be used together. In fact, any method or combination of methods for displaying context data that lie beyond the visible portion of the map may be used without departing from the spirit and the scope of embodiments of the present invention.

Referring now to FIG. 5, in one embodiment of the present invention, after updating a representation of the cursor to reflect the context data, the mobile station 10, and, in particular, means such as a processing device 308, may present one or more alternatives to advance the cursor based on the context data, as in Block 506. For example, in one embodiment, the mobile station 10 may be configured to operate a route planning application or a navigation application having a context-indicative cursor. At a given point along the route being planned by the user, or while a user is en route, a user may reach a decision point along the route and be presented with alternatives for selecting the next step in the route. For example, the current position of the cursor on the map, or the current location of the mobile station 10, may be located at an intersection of two or more roads, as shown in FIG. 6D. At such a point, a central area of the cursor 653 may have been updated to reflect the context data at that location associated with the position of the cursor on the map, and the cursor may include arrows 655, 656, and 657 to reflect the context data at the areas proximate that location on the map. For example, according to one embodiment, a color scheme may be used where one color, represented by no shading as in central area 653 and arrow 657, may indicate a safe area at the current position of the cursor on the map and in the forward direction from the current position, and another color, represented by shading as in arrows 655 and 656, indicating an unsafe location to the left and right directions of the current location. Thus, the cursor may represent the fact that, for example, the current location is a safe area, proceeding straight leads to a safe area, but turning right or left leads to an unsafe area.

At Block 507, according to one embodiment of the present invention, the mobile station 10, and, in particular, means such as a processing device 308, may receive user input selecting at least one of the alternatives presented at Block 506 above. In one embodiment, the mobile station 10 may receive the selection via an input device (e.g. mouse, touch pad, touch screen, keypad, keyboard, voice command, etc.). For example, the user may click on one of the alternatives using a mouse device, or the user may simply move the cursor in the direction of one of the alternatives to select it. In another embodiment, the mobile station 10 may receive the selection in the form of detecting the movement of the mobile station 10 in the direction of one of the alternatives as detected by, for example, a positioning sensor 326. In fact, any method of receiving user input may be used to select an alternative without departing from the spirit and the scope of embodiments of the present invention.

Upon receiving the user input selecting an alternative, according to one embodiment, the mobile station 10, and, in particular, means such as a processing device 308, may update the position of the cursor on the map based on the selected alternative. In one embodiment, the mobile station 10 may update the position of the cursor on the map to the next decision point in the route. In another embodiment, the mobile station 10 may update the position of the cursor on the map based on the new location of the mobile station 10. Additionally, according to another embodiment, the selection of an alternative may be used to refine the context data to be displayed and/or future alternatives to be presented. According to one embodiment, once the position of the cursor has been updated based on the selected alternative, the mobile station 10 may obtain context data relating to the new position of the cursor on the map and update the representation of the cursor to reflect the context data. In another embodiment, the mobile station 10 may wait to present new alternatives to advance the position of the cursor based on the context data until the next decision point is reached.

Conclusion:

As described above, embodiments of the present invention may be configured as an apparatus or method. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

Embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus, such as processor 210 discussed above with reference to FIG. 2 or processing device 308 discussed above with reference to FIG. 3, to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus (e.g., processor 210 of FIG. 2 or processing device 308 of FIG. 3) to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   causing, at least in part, a presentation of a map;
   determining, by a processor, a position of a cursor on the map;
   obtaining context data relating to the position of the cursor on the map; and
   updating a representation of the cursor to reflect the context data,
   wherein the updated representation indicates another position on the map,
   wherein updating a representation of the cursor further comprises determining one or more visible indicia representing the context data and updating the representation of the cursor to include the one or more visible indicia,
   wherein the visible indicia comprise one or more arrows pointing in a direction of the another position,
   wherein the another position is determined based, at least in part, on the context data,
   wherein the visible indicia comprise a representation of a distance from the position of the cursor on the map to the another position, and
   wherein the another position is outside the representation of the cursor.

2. The method of claim 1, wherein obtaining context data further comprises obtaining context data relating to an area proximate the position of the cursor on the map, and wherein the context data relates to a physical area proximate to a physical location indicated by the position.

3. The method of claim 2, wherein updating a representation of the cursor further comprises updating the representation of the cursor to reflect the context data relating to the area proximate the position of the cursor on the map.

4. The method of claim 1, wherein the visible indicia comprise a color selected from a plurality of colors, each color being associated with different context data.

5. The method of claim 1, further comprising: determining one or more audible or vibratory indicia representing the context data; and providing for generation of the audible or vibratory indicia.

6. The method of claim 1 further comprising:
   receiving a user input for selecting a type of location-based map information, wherein obtaining context data relating to the position of the cursor on the map is based on the user input.

7. The method of claim 1 further comprising:
   causing, at least in part, a presentation of one or more alternatives to advance the cursor based on the context data;
   receiving user input selecting at least one of the alternatives; and
   updating the position of the cursor on the map based on the selected at least one of the alternatives.

8. An apparatus comprising:
   at least one processor; and
   at least one memory including computer program code,
   the at least one memory and the computer program code configured to, with the at least one processor, cause the apparatus to perform at least the following:
   cause, at least in part, a presentation of a map;
   determine a position of a cursor on the map;
   obtain context data relating to the position of the cursor on the map; and
   update a representation of the cursor to reflect the context data,
   wherein the updated representation indicates another position on the map,
   wherein the update of the representation of the cursor further comprises determining one or more visible indicia representing the context data and updating the representation of the cursor to include the one or more visible indicia,
   wherein the visible indicia comprise one or more arrows pointing in a direction of the another position,
   wherein the another position is determined based, at least in part, on the context data,
   wherein the visible indicia comprise a representation of a distance from the position of the cursor on the map to the another position, and
   wherein the another position is outside the representation of the cursor.

9. The apparatus of claim 8, wherein the apparatus is further caused to obtain context data by obtaining context data relating to an area proximate the position of the cursor on the map, and wherein the context data relates to a physical area proximate to a physical location indicated by the position.

10. The apparatus of claim 9, wherein the apparatus is further caused to update a representation of the cursor by updating the representation of the cursor to reflect the context data relating to the area proximate the position of the cursor on the map.

11. The apparatus of claim 8, wherein the apparatus is further caused to determine one or more audible or vibratory indicia representing the context data, and wherein the processor is configured to provide for generation of the audible or vibratory indicia.

12. The apparatus of claim 8, wherein the apparatus is further caused to receive a user input for selecting a type of location-based map information, and wherein the processor is configured to obtain context data relating to the position of the cursor on the map based on the user input.

13. The apparatus of claim 8, wherein the apparatus is further caused to cause, at least in part, a presentation of one or more alternatives to advance the cursor based on the context data, wherein the processor is configured to receive user input selecting at least one of the alternatives, and wherein the processor is configured to update the position of the cursor on the map based on the selected at least one of the alternatives.

14. A non-transitory computer-readable storage medium carrying one or more sequences of one or more instructions which, when executed by one or more processors, cause an apparatus to at least perform the following steps:
    causing, at least in part, a presentation a map;
    determining a position of a cursor on the map;
    obtaining context data relating to the position of the cursor on the map; and
    updating a representation of the cursor to reflect the context data,
    wherein the updated representation indicates another position on the map,
    wherein updating a representation of the cursor further comprises determining one or more visible indicia representing the context data and updating the representation of the cursor to include the one or more visible indicia,
    wherein the visible indicia comprise one or more arrows pointing in a direction of the another position,
    wherein the another position is determined based, at least in part, on the context data,
    wherein the visible indicia comprise a representation of a distance from the position of the cursor on the map to the another position, and
    wherein the another position is outside the representation of the cursor.

15. The computer-readable storage medium of claim 14, wherein obtaining context data further comprises obtaining context data relating to an area proximate the position of the cursor on the map, and wherein the context data relates to a physical area proximate to a physical location indicated by the position.

16. The computer-readable storage medium of claim 14 further comprising:
    receiving a user input for selecting a type of location-based map information, wherein obtaining context data further comprises obtaining context data relating to the position of the cursor on the map based on the user input.

* * * * *